(12) United States Patent
Hecht

(10) Patent No.: US 10,781,319 B2
(45) Date of Patent: Sep. 22, 2020

(54) ULTRA HIGH TEMPERATURE ENVIRONMENTAL PROTECTION COATING

(71) Applicant: Lockheed Martin Corporation, Bethesda, MD (US)

(72) Inventor: Daniel H. Hecht, Fort Worth, TX (US)

(73) Assignee: LOCKHEED MARTIN CORPORATION

( * ) Notice: Subject to any disclaimer, the term of this patent is extended or adjusted under 35 U.S.C. 154(b) by 536 days.

(21) Appl. No.: 15/211,018

(22) Filed: Jul. 15, 2016

(65) Prior Publication Data

US 2016/0319135 A1    Nov. 3, 2016

Related U.S. Application Data

(63) Continuation-in-part of application No. 13/011,675, filed on Jan. 21, 2011, now Pat. No. 9,581,030.

(51) Int. Cl.
| | |
|---|---|
| *C09D 5/18* | (2006.01) |
| *C09D 1/00* | (2006.01) |
| *B64C 3/36* | (2006.01) |
| *F01D 5/28* | (2006.01) |

(Continued)

(52) U.S. Cl.
CPC .............. *C09D 5/18* (2013.01); *B64C 3/36* (2013.01); *B64C 11/205* (2013.01); *C09D 1/00* (2013.01); *F01D 5/288* (2013.01); *B64C 30/00* (2013.01); *F05D 2300/512* (2013.01); *F05D 2300/608* (2013.01); *F05D 2300/6033* (2013.01); *Y02T 50/67* (2013.01)

(58) Field of Classification Search
CPC .... C04B 2235/5284; C04B 2235/5288; C04B 2235/5292; F05D 2300/6033; F01D 5/288
See application file for complete search history.

(56) References Cited

U.S. PATENT DOCUMENTS

| | | |
|---|---|---|
| 2,763,569 A | 9/1956 | Bradstreet et al. |
| 2,972,529 A | 2/1961 | Alexander et al. |
| 3,110,571 A | 11/1963 | Alexander et al. |

(Continued)

OTHER PUBLICATIONS

Wuchina, E., "UHTCs: Ultra-High Temperature Ceramic Materials for Extreme Environment Applications," The Electrochemical Society Interface, Winter 2007, pp. 30-36.

(Continued)

*Primary Examiner* — Monique R Jackson
(74) *Attorney, Agent, or Firm* — Bracewell LLP; Jim Bradley

(57) ABSTRACT

An environmental protective coating ("EPC") for protecting a surface subjected to high temperature environments of more than 3000 degree F. The coating includes a dense platelet lamellar microstructure with a self-sealing, compliant binder material for holding the platelets together. The platelets may be formed from materials that are resistant to high temperatures and impermeable, such as ceramics. The lamellar microstructure creates a tortuous path for oxygen to reach the surface. The binder material includes engineered free internal volume, which increases the elastic strain of the EPC. The binder is softer than the platelets, which in combination with its free volume increases pliability of the EPC. The binder may have sufficient glass content and glass-forming content for initial and long-term sealing purposes.

13 Claims, 7 Drawing Sheets

(51) Int. Cl.
*B64C 11/20* (2006.01)
*B64C 30/00* (2006.01)

(56) References Cited

U.S. PATENT DOCUMENTS

| | | |
|---|---|---|
| 3,705,791 A | 12/1972 | Bredzs |
| 3,864,093 A | 2/1975 | Wolfla |
| 3,864,140 A | 2/1975 | Ferrigno |
| 4,756,895 A | 7/1988 | Boecker et al. |
| 5,820,976 A | 10/1998 | Kamo |
| 6,884,524 B2 | 4/2005 | Ackermann et al. |
| 6,977,060 B1 | 12/2005 | Merrill et al. |
| 7,691,175 B2 | 4/2010 | Shimoda et al. |
| 2005/0208338 A1 | 9/2005 | Fernie et al. |
| 2007/0093587 A1 | 4/2007 | Shen et al. |
| 2007/0274837 A1 | 11/2007 | Taylor et al. |
| 2008/0026160 A1 | 1/2008 | Taylor et al. |
| 2008/0213167 A1 | 9/2008 | Taylor et al. |
| 2008/0260952 A1* | 10/2008 | Xiao ............ B82Y 30/00 427/373 |
| 2009/0305106 A1 | 12/2009 | Gell et al. |
| 2012/0189871 A1 | 7/2012 | Hecht |
| 2013/0209682 A1 | 8/2013 | Massingill, Jr. et al. |
| 2017/0023168 A1* | 1/2017 | Kobayashi ............ C09D 7/62 |

OTHER PUBLICATIONS

Refractory Pantry, http://inspi.ufl.edu/data—No Date.
Ciullo, P."Strength and Sheen," Paint & Coatings Industry Magazine, May 2003, pp. 1-7, http://www.rtvanderbilt.com/awards_9 htm.

* cited by examiner

ULTRA HIGH TEMPERATURE ENVIRONMENTAL PROTECTION COATING

CROSS REFERENCE TO RELATED APPLICATIONS

This application is a continuation-in-part of, and claims priority to and the benefit of, co-pending U.S. patent application Ser. No. 13/011,675, filed Jan. 21, 2011, the full disclosure of which is hereby incorporated by reference herein for all purposes.

BACKGROUND OF THE INVENTION

1. Field of Invention

The present invention relates generally to surface coatings and more particularly, an improved environmental barrier coating to protect a surface subjected to ultra-high temperatures and oxidation.

2. Description of Prior Art

It is often necessary to protect high temperature articles with an Environmental Protection Coating ("EPC"). EPCs are used to insulate surfaces from high temperature, and/or protect the surfaces from exposure to damaging chemicals. Some surfaces on which EPCs are applied include hot sections of gas turbines or jet engines, such as combustor cans, nozzle guide vanes, and turbine blades. One of the functions of these coatings is to increase engine efficiency by elevating the operational temperature or reducing the need for cooling air. The use of thermal barrier coatings in large turbines for land-based power generation is critically necessary for an acceptable operating lifetime. EPCs and cooling mechanisms are often used in turbine systems to protect the metallic parts that comprise turbines. The EPC enables extension of component life and improved reliability by lowering the operating metal temperature, thereby also lowering loss of strength and oxidation. As such, costs are reduced by eliminating elaborate cooling schemes required for metals in high temperature applications. The increased maximum gas temperature permitted by the EPC insulating and chemical protective capabilities provides significant performance improvement and thus large cost savings by increasing the turbine inlet temperatures. Efficiency improvements are thus limited by the capabilities of the EPC applied to turbine parts, such as the blades. Higher temperature EPCs may also enable similar efficiency improvements in small radius hypersonic aircraft leading edges, higher thermal efficiency engine components and exhaust washed surfaces.

The life and performance of high speed aircraft may also be improved by the application of EPCs. As with the turbine blades, the EPC's provide protection from heat and oxidation within the limits of the EPCs. The application of EPCs on forward facing surfaces is especially important for hypersonic aircraft due to the pronounced aero-thermal heating that occurs at those speeds. The operational speed of the wing and thus the aircraft is thus also limited by the capabilities of the EPC applied to the leading edges.

The current EPC's used at temperatures approaching 3000 degrees F. are typically silica-sealed ceramics. Hypersonic edge coatings are typically silica while turbine blades are typically Zirconia based. The ceramic coating may employ refractory oxides, nitrides, borides or carbides, to provide the thermal barrier. Refractory materials may include compounds of Al, Si, Zr, Hf, and Ta, among others. Silicon-based coatings, which oxidize to silica glasses, have capabilities of between 2400 to 3000 degrees F., depending on the lifetime required, can remain effective for up to thousands of hours or for short term single use, respectively. At ultra high temperatures, i.e. above 3000 degrees F., the current EPC's degrade rapidly.

Attempts to develop higher temperature EPC's, however, have been met with various material deficiencies as shown below:

1. Sealant qualities: In order to ensure initial and in-use requirements to impede the ingress of oxygen to the substrate, the coating must be able to form appropriate sealing glasses (oxides) to seal off any cracks, pin-holes or porosity that may develop from chemical activities or physical stresses. Current high temperature EPC's do not provide adequate sealing from oxygen at ambient, intermediate and ultra high temperatures.

2. Compliance: High thermal strains are typically experienced in weak and high modulus EPC ceramics. This strain creates stresses greater than constituent failure strength for high CTE or temperature differential, causing spalling and cracking.

3. Volatility: sealing materials sometimes have high vapor pressures at the temperatures of interest; some, like silica, enter a regime of active oxidation and rapidly degrade. Very high internal vapor pressure can push aside viscous sealants creating pin-holes.

4. Mis-matched Coefficient of Thermal Expansion ("CTE"): Protective coatings typically expand at a different rate than the substrate when heated and generate very high stresses leading to cracks, pin-holes, and spalling.

5. Chemical incompatibility: EPC constituents capable of producing environmentally stable compounds may be reactive with the substrates.

6. Adhesion: Existing EPCs may not adhere well to the substrate.

Attractive compounds exist that may be useful in developing improved EPCs. Intermetallic MAX phase compounds are ternary carbides and nitrides with the general formula $M_{n+1}AX_n$ (MAX) with n=1-3. M is an early transition metal, A is an A-group element (predominantly IIIA and IVA in the periodic table) and X can be carbon and/or nitrogen. These compounds behave like metals regarding their machinability and their thermal and electrical conductivities but behave like ceramics in terms of stiffness, oxidation resistance, thermal stabilities and high melting points. However, even these attractive materials do not have the breath of properties required for ultra high temperature environments as they are poly-crystalline, develop high thermal stresses, tend towards cracking and oxidation at grain boundaries, providing pathways for oxygen to reach the substrate surface when exposed to conditions above their maximum use temperature, which is typically 2600° F. Use of such materials would require an integrated material engineering solution combining material characteristics in advantageous micro-structures by further processing.

There is thus a continuing and pressing need for improved EPCs so as to advance the efficiency and life of articles subjected to ultra high temperatures.

SUMMARY OF THE INVENTION

Described herein is an example of a coating for protecting a surface and that includes heat resistant platelets arranged in layers on the surface, a compliant binder between the platelets and the surface, and elongate voids in the binder having a generally rectangular cross section so that the binder material is formed into axially spaced apart elongate layers connected by axial web members. In one embodiment, the adjacent voids are generally parallel. The coating can further includes tubes in the voids having a generally rectangular cross section. In an alternative, the tubes are made up of a refractory oxide shell. Optionally, the tubes further have a carbon tube within the shell. In an example, some adjacent voids are parallel and define arrays, and wherein voids in some of the arrays are oblique to voids in other arrays so that the binder is anisotropic. More than one layer of voids can be disposed between axially spaced apart adjacent platelets. The platelets can be made from a refractory material. In an embodiment, the surface has portions with different coefficients of thermal expansion.

Also described herein is another example of a coating for protecting a surface and which includes a layer of platelets that each include a heat resistant material, a compliant binder between the platelets and the surface, and engineered voids in the binder that are elongate and parallel to one another, so that when a lateral force is applied to a one of the platelets, and displaces the a one of the platelets with respect to the surface, a portion of the binder adjacent the a one of the platelets undergoes an elastic strain. The voids can have a generally rectangular cross section. In one example, the voids define a first array, the binder further having a second array of engineered voids that are parallel and oriented oblique to the voids in the first array, so that the binder is anisotropic. Tubes can optionally be included in the voids, and wherein a ratio of lengths of the platelets to the tubes ranges from about 5 to about 30.

A method of environmentally protecting a surface is described herein and that involves applying a coating to the surface, where the coating is made up of planar platelets in a lamellar arrangement, and a binder composition disposed between adjacent platelets; where the binder has mortar with elongate voids in the mortar. The method further includes curing the coating so that the coating adheres to the surface to define a protected surface. In an example the voids have a generally rectangular cross section and are arranged in rows, so that the mortar has planar layers interconnected by web members. In one embodiment, the planar layers are substantially perpendicular to the web members. The voids can be formed by carbon tubes that are disposed in the mortar and strategically arranged so that a number of the adjacent carbon tubes are arranged in parallel to define arrays, and wherein the arrays are oriented oblique to one another, so that the binder has anisotropic strain characteristics. In one example the protected surface is on an aircraft, and the method further includes operating the aircraft so that a surface of the cured coating opposite from the protected surface is exposed to a temperature of at least around 2500° F.

DETAILED DESCRIPTION OF THE INVENTION

Figure 1:
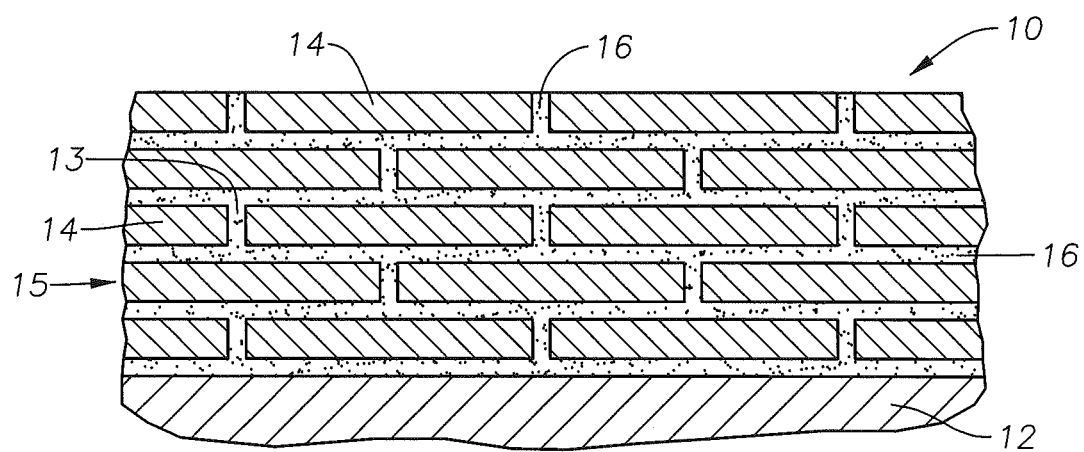
FIG. 1 is a cross sectional, schematic view of an example of an EPC applied to a surface that resists ultra high temperatures and inhibits oxidation of the surface, in accordance with embodiments of the present invention.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are used to illustrate a relational location. In an embodiment, usage of the term "about", "generally", and "substantially" each include +/−5% of the cited magnitude.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

Referring to FIG. 1, a sectional schematic view of an embodiment of an EPC 10 applied to a substrate 12 is shown. Examples of the substrate 12 include a surface subjected to an ultra-high temperature, a surface on a vehicle, a surface on an aircraft, a surface on a space craft, a surface on a turbine blade surface, a surface on an exhaust washed surfaces, and a surface on an aircraft wing surface subjected to high temperature environments. In an embodiment, the EPC 10 operates at ultra-high temperatures, i.e. more than 3000 degree F. and without degrading, spalling, or delaminating from its associated substrate 12.

The EPC 10 includes a microstructure of platelets 14 held together by binder material 16. In an embodiment, the platelets 14 have a thickness of from about 5 microns to 25 microns, with a length to thickness (L/T) ratio of from 5 to 20, and are resistant to temperatures above 3000 degree F. Optionally, the platelets 14 may be arranged in a lamellar or nacreous fashion, and may further optionally have a coefficient of thermal expansion that ranges from about 50% to about 150% of the thermal expansion of the material of the substrate 12. Nacreous refers to the similarity in the layering of platelets to that seen in nacre or shells. In an example embodiment, staggered lamellar or nacreous layering results in spaces 13 between adjacent platelets 14 that are laterally offset from spaces 13 between adjacent platelets 14 in at least a next layer 15 of platelets 14. Optionally, the spaces 13 between adjacent platelets 14 may be offset along multiple layers of platelets 14. The platelets 14 provide structure, strength, and impermeability to the EPC 10 and may be formed from one or a combination of the following: a refractory oxide, mixed refractory oxides, refractory ceramics, refractory metals or alloys, intermetallic compounds. Specific examples of materials for use in forming the platelets 14 include $ZrB_2$, Ta, Cr, $CrO_2$, $CaO_2$, $MgO_2$, metal nitrides, such as SiN, HfN, TaN, ZrN, ScN, YN, $NB_2N$, NbN, $Be_3N_2$, $Ta_2N$, $Th_3N_2$, VN, $Ba_3N_2$, AlN, UN, TlN, and BN; intermetallic compounds, such as ReW, $Re_{24}T_{15}$, $OsTa_3$, WPl, $IrTa_3$, PtRe, $Ir_3Nb$, $Ir_3Tl$, $HfMo_2$, OsTl, RuTl, $W_2Zr$, $Nb_3Sn$, $RhTa_3$, IrTl, $IrNb_2$, YBl, $Cr_2Ta$, $Be_{13}Zr$, $UBe_{13}$, $Al_2Mo$, $Rh_3Ta$, RuZr, $IrNb_3$, IrTa, $IrNb_3$, $Mo_3Al$, $GeMo_5$, ZrGe, $Zr_2Ge$, $Ir_3Tl$, $Re_3Mo_2$, $OsTa_3$, $Re_3W_2$; silicides such as, $Nb_5Si_3$, $Hf_3Si_2$, $W_5Si_3$, $Zr_5Si_3$, TaSi2, HfSi, $Mo_3Si_2$, $WSi_2$, $Ti_5Si_3$, $Mo_5Si$, $MoSi_2$, ZrSi, $Zr_3Si_2$, $V_5Si_3$, $Zr_2Si$, $Zr_4Si_3$, $Zr_6Si_5$, $Hf_5Si_3$, $Ta_2Si$, and $Ta_5Si_3$; silicates such as $Mg_2SiO_4$, $Ca_2SiO_4$, $BaSiO_4$, $SaSiO_4$, $ZrSiO_3$, $ZrSiO_4$, and $SrSiO_4$; oxides, such as $MgV_2O_4$, $Nd_4SrO3$, $Ca_3TtO_5$, $MgAl_2O_4$, $MgZrO_3$, $Be_3Zr_2O_7$, $Eu_2O_3$, $CaCrO_4$, $Gd_2O_3$, $BeZr_2O_3$, BaThO, $La_2O_3$, $Sn_2O$, $Y_2O_3$, $Yb_2O_3$, $LaHfO_3$, $LaCrO_3$, $Ce_2O_3$, $BaZrO_3$, $SrZrO_3$, $ZrO_2$—$Eu_2O_3$, $SrHfO_3$, $SrZrO_3$, $HfO_2$, $ThZrO_4$, $ThO_2$, $UO_2$, MgO, $ZrO_2$, $Sr_4Zr_3O_{10}$, CaO, BeO, $Sc2O_3$, $CeCr_2O_5$, SrO, $DyO_2$, $Dy_2O_3$, $CaZrO_3$, $Cr_2O_3$, $PuO_2$, Pu2O3, $CaCr_2O_4$, $NiAl_2O_4$, $Al_2O_3$, $La_2MgO_3$, $Al_2BaO_4$, $Al_2NiO_4$, $Cr_2MgO_4$, $Al_2NiO_4$, SiO, HfO, SiO, TiO, and $Al_2SrO_4$; carbides, such as metal carbides, including $BoC_2$, $Ni_3C$, $GdC_2$, $Be_2C$, $YC_2$, $Co_2C$, UC, BC, $Ce_4C$, $Al_4C_3$, MoC, $Mo_2C$, SiC, VC, WC, $NB_2C$, TiC, $W_2C$, $THC_2$, THC, $PrC_2$, $U_2C_3$, $LaC_2$, LaC, $UC_2$, $Co_3C$, $CaC_2$, $SnC_2$, $NdC_2$, $V_2C$, $La_2C_3$, HfC; MAX phase type high temperature compounds, and combinations thereof.

An example of a binder 16 is shown in the spaces between adjacent platelets 14. In an example embodiment, the binder 16 (that may also be referred to as a mortar) is relatively softer than the platelets 14. Optionally, the binder 16 is made up of a binder resin and particulate matter for setting the spacing between the platelets 14. As will be discussed in more detail below, the binder 16 of the present disclosure may include additional additives. In an example embodiment, the platelets 14 can have a Young's modulus of around $5 \times 10^6$ to $60 \times 10^6$ pounds per square inch; the Young's modulus of the binder 16 may range from about 0.1% to about 10% of the Young's modulus of the platelets 14. The binder 16 provides flexibility and toughness to the EPC 10. The composition of the binder 16 will be explained in more detail in a subsequent section.

Figure 2:
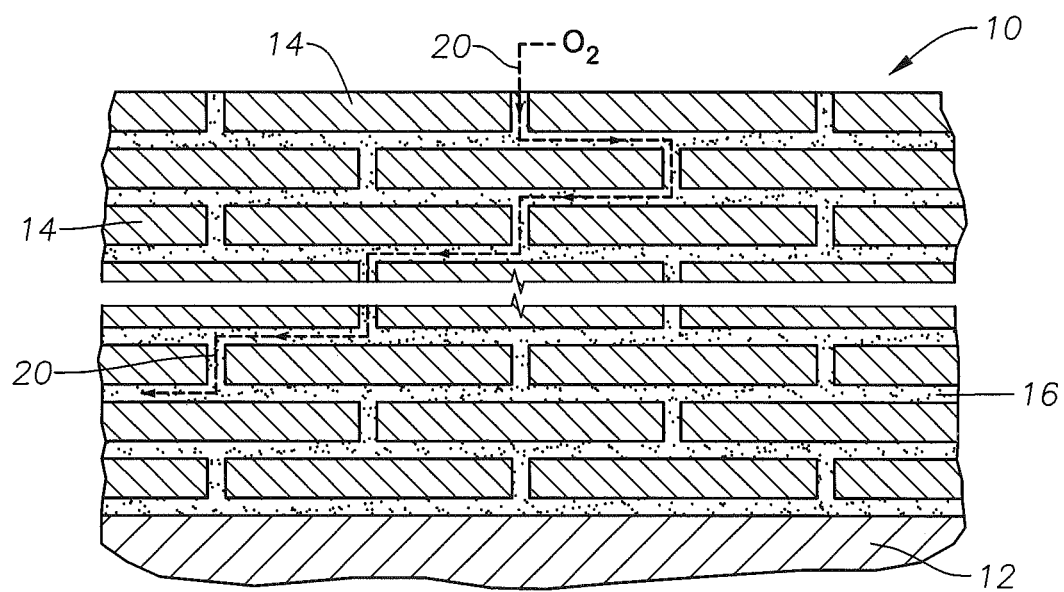
FIG. 2 is a cross sectional, schematic view of the EPC of FIG. 1 showing an example of oxygen migration during operation, in accordance with embodiments of the present invention.
Figure 3:
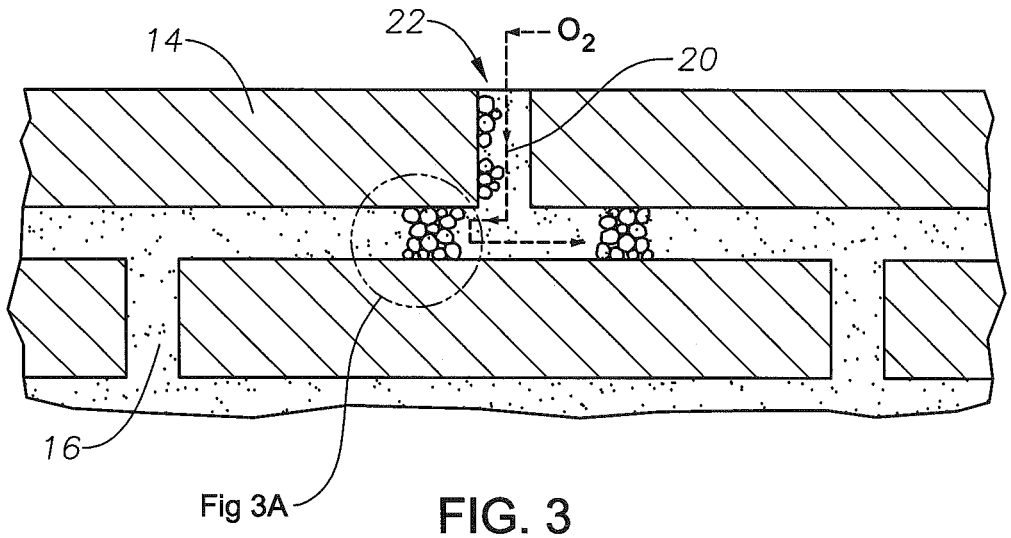
FIG. 3 is a cross sectional, schematic view of the oxide formation in the EPC of FIG. 1, in accordance with embodiments of the present invention.
Figure 3A:
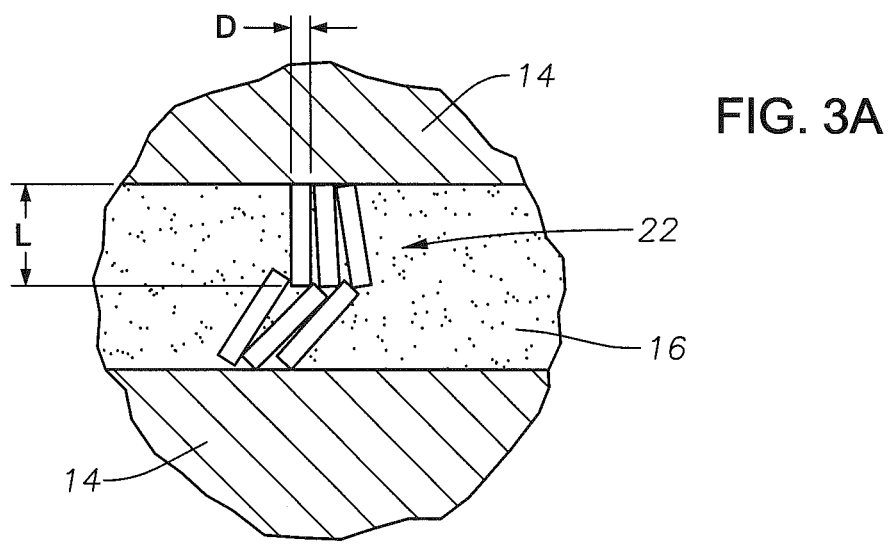
FIG. 3A is an enlarged cross sectional, schematic view of a portion of the oxide formation shown in FIG. 3, in accordance with embodiments of the present invention.

Referring now to FIG. 2, an advantage of the present disclosure is illustrated by how the staggered lamellar arrangement of platelets 14 within the EPC 10 resists oxygen $O_2$ migration to the substrate 12 by forming a tortuous path 20 for the oxygen, $O_2$, flowing within the binder 16 and between the platelets 14. Moreover, as shown in FIGS. 3 and 3A, resistance to migration introduced by the tortuous path 20 can be further enhanced by disposing oxidizable matter within the binder 16. The oxidizable matter can be made up of refractory metals, intermetallics, metals such as Al, Si, Ti, Ni, Zn, Mg, or un-oxidized constituent materials for use in forming the platelets 14 listed above. When contacted and oxidized by the migrating $O_2$, the volume of the oxidizable matter increases and may possess fluxing abilities expanding, wetting and sealing cracks formed by thermal expansion and thermal volatization of lower temperature refractories, thereby resisting $O_2$ flow through the binder 16. The oxidizable matter can be provided in the binder 16 as particulates, solid solutions, or as a coating on another particulate. In an example embodiment, the oxidizable matter in the binder 16 oxides to form glass oxides 22 when contacted by the migrating oxygen $O_2$. As noted above, the oxides 22 can fill cracks, intersties, and voids in the binder 16 so that the binder 16 becomes a barrier to oxygen $O_2$ flow; making it more difficult for the oxygen $O_2$ to navigate through the binder 16, thereby protecting the substrate 12 from oxidation.

The production of oxides 22 by oxidizable elements of EPC 10, phase changes, and thermal expansion of base 12, EPC 10, platelets 14 and binder 16, at operating temperature increase their respective volumes, which can potentially lead to the EPC 10 failing due to differential volume increase and resulting strain buildup. To allow for the increase in volume and provide strain release, the binder 16 can include porous or easily cleaved particulates of refractory materials. The particulates provide the binder 16 of the EPC 10 with low stress, high strain free volume necessary to accommodate the increased volume due to the oxide growth 20 and thermal strains produced. In an example, high strain deflection is greater parallel to the elongated sides of the platelet 14 to provide maximum strain release in-plane. The platelets 14 together with the micro-structure of the binder 16 result in a tough EPC 10 that can protect a substrate 12 from ultra-high temperatures and oxidation and provide the flexibility and free volume to accommodate oxide formation and thermal expansion mismatches. In an example embodiment, the free volume locations in the binder 16 are randomly and/or irregularly spaced to thereby introduce multiple degrees of freedom within the EPC 10. The free volume can absorb strain in any direction, thereby correspondingly reducing or eliminating stress (in any direction) in the EPC 10 that might result from the strain.

Figure 4:
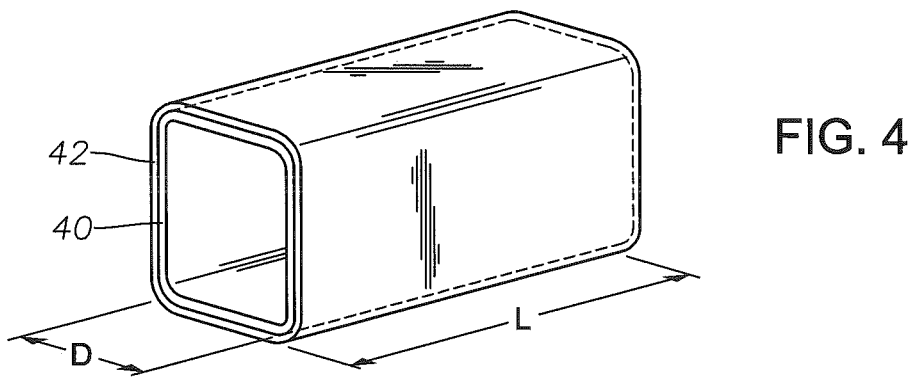
FIGS. 4-6A are schematic views of a process for manufacturing an EPC, in accordance with embodiments of the present invention.
Figure 5:
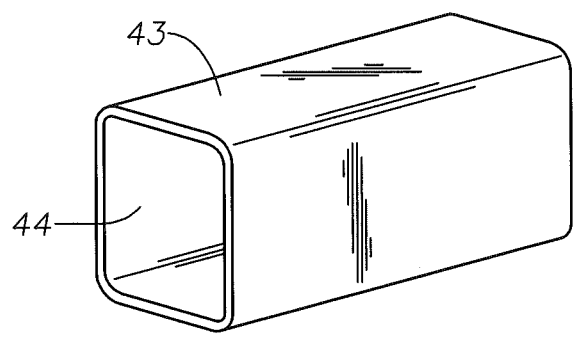
Figure 6:
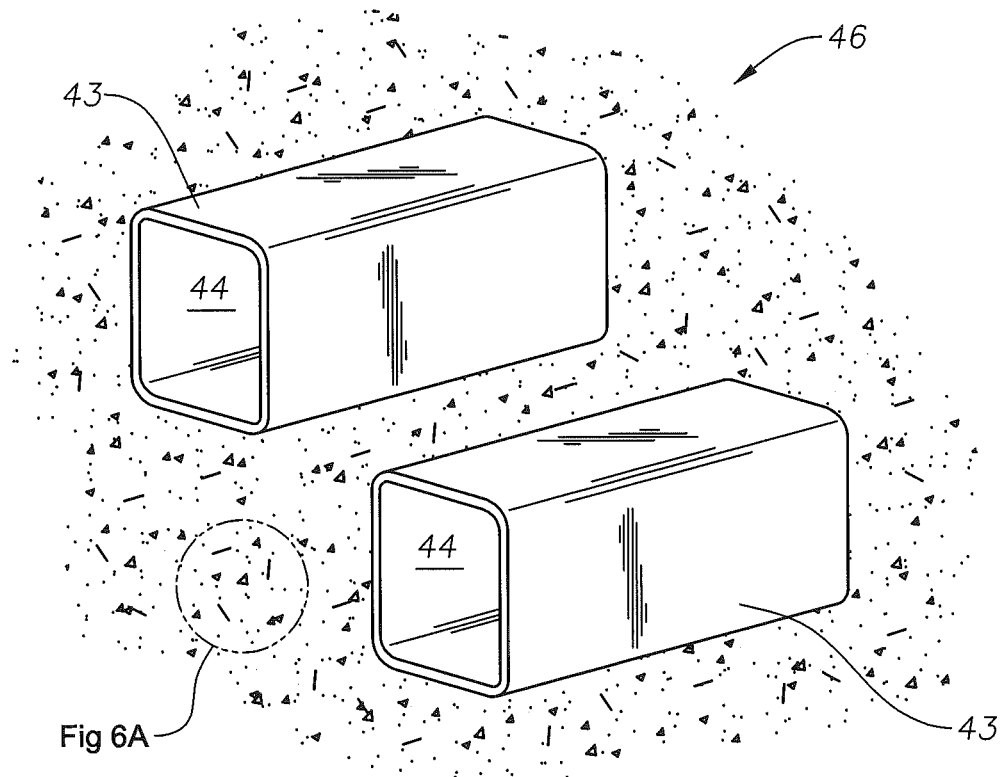

The EPC 10 may be manufactured using various methods. One embodiment of the manufacturing process to produce the EPC 10 is illustrated in FIGS. 4-6. As shown in FIG. 4, the binder material 16 (FIG. 1) can be formulated by utilizing a skeleton or scaffold 40 made from carbon, lower temperature materials of the same candidates for the oxidizable matter within the binder 16, or other volatizable material. The skeleton 40 may be a hollow member made up of particulate matter, preferably with a high aspect cross-section shape for low stiffness in one or more axes and with short length L to depth D (L/D) ratio. Example lengths and depths of the skeleton 40 can be in the sub-micron range to allow better processing, as shown in FIG. 4 or alternatively FIGS. 9 and 10. In an example embodiment, the L/D ratio can range from about 1 to about 10, in one embodiment the L/D ratio can range from about 2 to about 5. Once the desired skeleton 40 is provided, the skeleton 40 may be coated with a refractory metal layer 42, refractory oxide, or their precursors, such as pre-ceramic polymer or vapor deposited components. The refractory metal layer 42 can then be oxidized while the skeleton 40 is vaporized slowly and allowed to permeate through the refractory metal layer 42 such that it is removed from the system without damage to the layer 42. The result is a refractory oxide shell 43 that takes on the general shape, dimensions, and L/D ratio of the removed skeleton 40, and that has a hollow space 44 within as shown in the example of FIG. 5. The hollow space 44 in the shell 43 provides free internal volume in the binder 16 (FIG. 1) that will allow for strain release associated with oxide 20 (FIG. 3) production during operation.

Constituents of the shell 43 can be materials that exhibit high strain, and may include one or two dimensional semi-crystalline or crystalline compounds, fractal morphologies, or constructions of stable and fugitive chemistries, and/or combinations thereof. In one example, the materials possess easily strained bonds or free volume with multi-axial or random axial orientation. The free volume can be produced during a pre-firing procedure before use which produces thermal shrinkage upon cooling, cleavage of the weak bonds and the free volume desired. Other fugitive components can increase the generation of free volume utilized by these cleaved constituents to produce a highly compliant microstructure. Graphite, zirconia diboride(gr), boron nitride(gr), mica and acicular wollastonite and zirconium mullite are examples of suitable crystalline materials. High intensity ball milling of C(gr) is an example of mechanical forming of sub-micron or nano-platelet compositions with minimal bonding and fugitive character in oxidizing environment. Eutectics can produce very fine, fractal morphologies, some of these compositions have ultra-high temperature ceramics and an oxidatively fugitive phase such as a Mo—ZrC system. These constituents produce short range, strain capability as-made or as-pyrolyzed or oxidized, that can be randomly oriented as required to yield planar quasi-isotropic compliance.

Figure 6A:
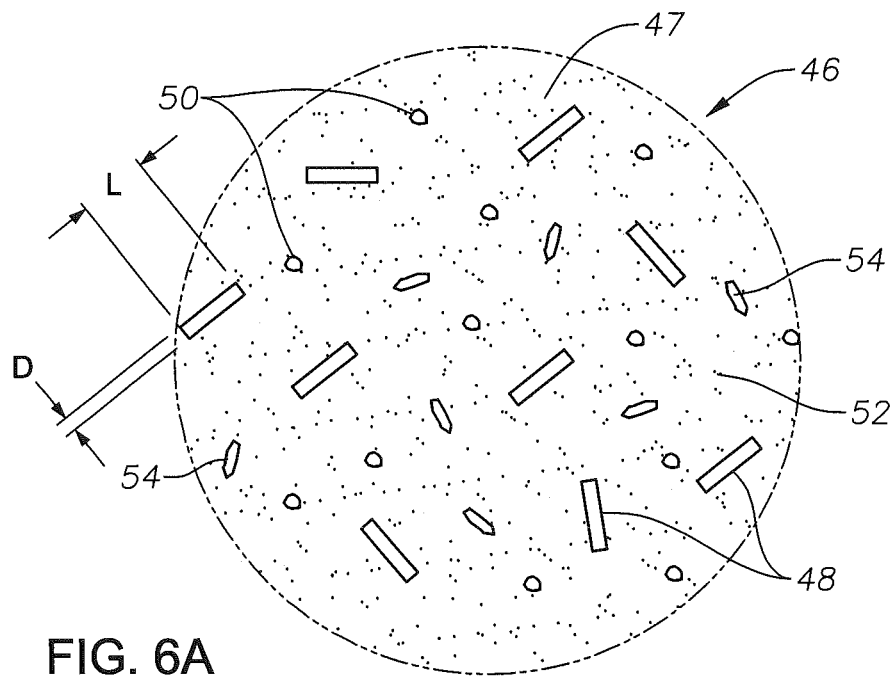

Referring now to FIGS. 6 and 6A, the refractory oxide high aspect ratio shells 43 can be compounded with a mixture 46 that may include pre-ceramic polymers 47, short fibers 48, ceramic particulate 50, sub-micron refractory metal powder 52, and fluxing elements 54. The short fibers 48 may be formed from ceramics or their precursors and have a length/depth ratio less than 20, and optionally less than 10. The ceramic particulate 50 can be made from ceramic binder material; examples of the sub-micron refractory metal powder 52 include Al, Hf, Si, Zr, Ta, Mg, and Ca. The sub-micron refractory metal powder 52 gives the binder 16 (FIG. 1) sealing capability against hot environmental gases via volume expanding oxide formation. The fluxing elements 54 may be anything that induces chemical activity during expected operational conditions, examples of fluxing elements 54 include boron, carbon, silicon, aluminum, titanium, tantalum, phosphorus, or others. Optionally, the fluxing element 54 may include the same candidate materials for the oxidizable matter within the binder 16. In an example embodiment, the fluxing elements 54 are disposed within one or more of the shells 43 and intermixed within the binder 16. In an example of use of this embodiment, the fluxing elements 54 are exposed to temperatures greater than at which they become active or mobile, thereby causing softening and chemical reactions through the binder 16. As such, the fluxing elements 54 can be used to enhance wetting, adhesion and sealing of the EPC 10. The mixture 46 is mixed in a ball mill together with the refractory oxide shells 43 into a smooth paste that has the capability of spacing the platelets 14 (FIG. 1) from about 5% to about 100% of the platelet 14 thickness. In an example embodiment the constituent materials 47, 48, 50, 52, 54 making up the paste have a particulate length approximately 50% to about 100% that of the platelets 14 spacing. The resulting paste can form the binder (mortar) material 16 used to hold together the platelets 14.

Figure 7:
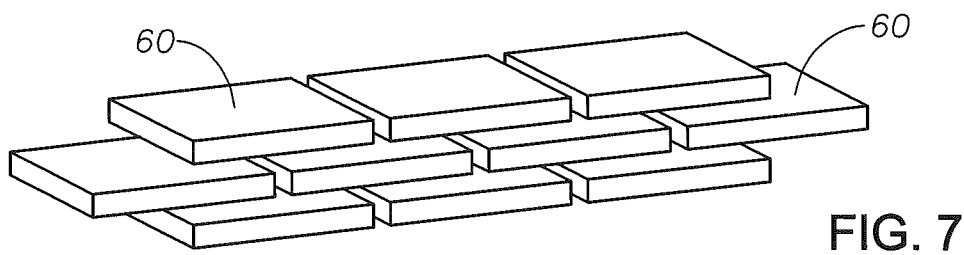
FIG. 7 is a perspective, schematic view of platelet geometry, in accordance with embodiments of the present invention.
Figure 8:
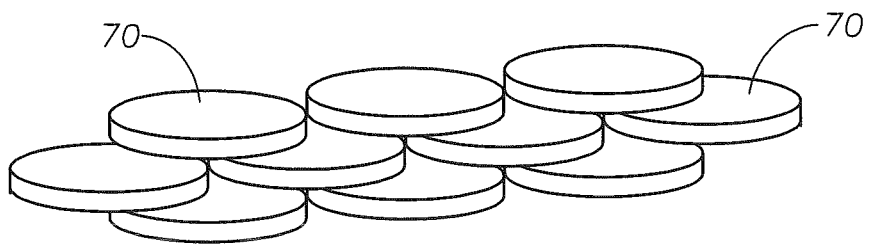
FIG. 8 is a perspective, schematic view of platelet geometry, in accordance with embodiments of the present invention.
Figure 9:
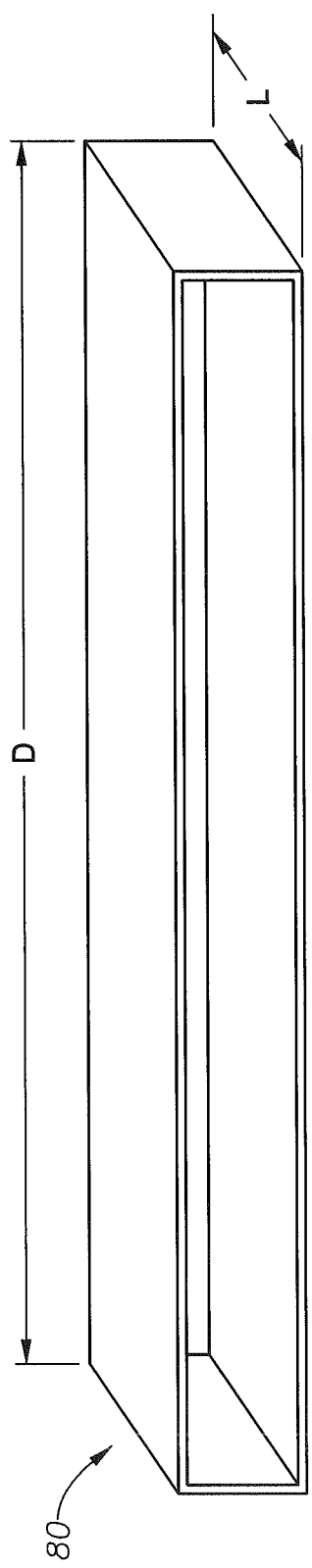
FIG. 9 is a perspective view of an alternate geometry for a scaffold used in the manufacturing of an EPC as described in FIGS. 4-6A.
Figure 10:
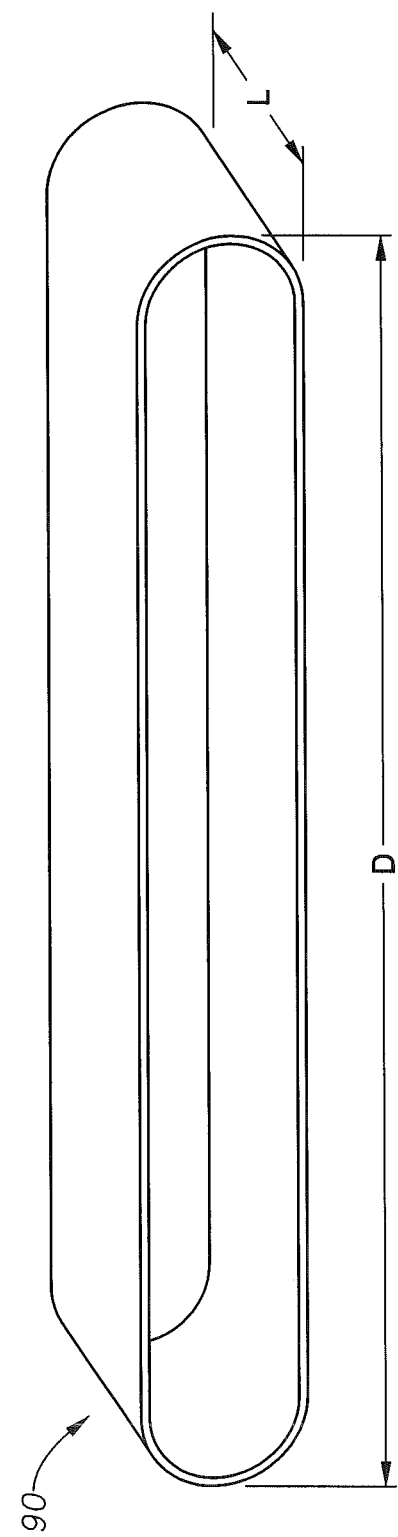
FIG. 10 is a perspective view of an alternate geometry for a scaffold used in the manufacturing of an EPC as described in FIGS. 4-6A.

Once the binder 16 is prepared, the platelets 14 can be added in and mixed thoroughly to wet all surfaces of the platelets 14 with binder 16. Solvents or fugitive resins may be used as necessary to add processability to the fully formulated EPC 10 thereby forming a paste. The EPC 10 paste is applied to the substrate 12 (FIG. 1), dried at a rate to minimize gas bubble formation, and is pre-fired to remove low temperature additives and fluxes. The EPC 10 may be fired to near anticipated operating temperature at rates that allow off-gassing of volatile compounds and impurities to proceed by molecular diffusion. The firing temperature can range from 50% to about 100% of expected operating temperature, depending on chemistry of the constituents. The platelets may have various geometries. For example, the platelets may be flat plates 60 arranged as shown in FIG. 7 or disks 70 as shown in FIG. 8. Each application of EPC 10 to a substrate 12 may have a thickness of from about 0.05 millimeters up to about 0.5 millimeters. Shown in perspective views in FIGS. 9 and 10 are alternate examples of scaffolds 80, 90 each having L/D ratios that are less than 1.0. The scaffold 80 of FIG. 9 has a generally rectangular cross section, whereas the scaffold 90 of FIG. 10 has a cross section that is generally oval shaped.

Applying multiple layers of the EPC 10 to the substrate 12 (FIG. 1) can provide flexibility in matching performance with materials and allows a certain amount of redundancy for geometry controlled heating. Aero-surfaces geometries and impinging airflow vary significantly, as does the resultant equilibrium temperature due to aero-thermal heating. The substrate is typically a single material with a single maximum use temperature. If no appropriate substrate material is available or a lower temperature material has superior performance, extra EPC thickness can reduce the exposure of the substrate 12 to allow its use, especially for sharp radii leading edges. If a single chemistry is not compatible with the increased temperatures and the substrate 12 matrix, multiple EPC formulations may be applied in layers to vary the properties to the local environment and improve compatibility. Thus, a family of compatible EPCs 10 may be used to match the maximum temperature of varying geometry and airflow to allow lower temperature materials or severe geometric features. In addition, as EPC 10 recession occurs, a benign failure mode may be achieved as single EPC layer failure does not immediately expose the substrate 12. As such, a color-coded system may be used to provide an early warning of degradation. For example, different regions of a blade or hypersonic leading edge on an aircraft wing can have a wide range of temperatures that increases as the radii decreases. The design of EPC system can thus be selected to match the operational temperature due to the radii and airflow and also achieve a benign and inspectable failure mode.

In an example embodiment, the EPC 10 described herein has the high barrier properties of a nacreous or lamellar composite, the toughness of a soft, ceramic binder 16 reinforced with the stiff, strong platelet 14 and the sealing capabilities of a chemical composition which forms stable, viscous oxides 22, with a final volume greater than the original coating constituent to ensure crack sealing. The EPC 10 may be used to retrofit existing applications and repair damaged units. The EPC 10 may be applied to a surface in various ways. For example, the EPC 10 may be applied as a paste or diluted and sprayed onto a surface. A sheet or film of the EPC 10 may also be fabricated that can be adhered to a surface.

Figure 11:
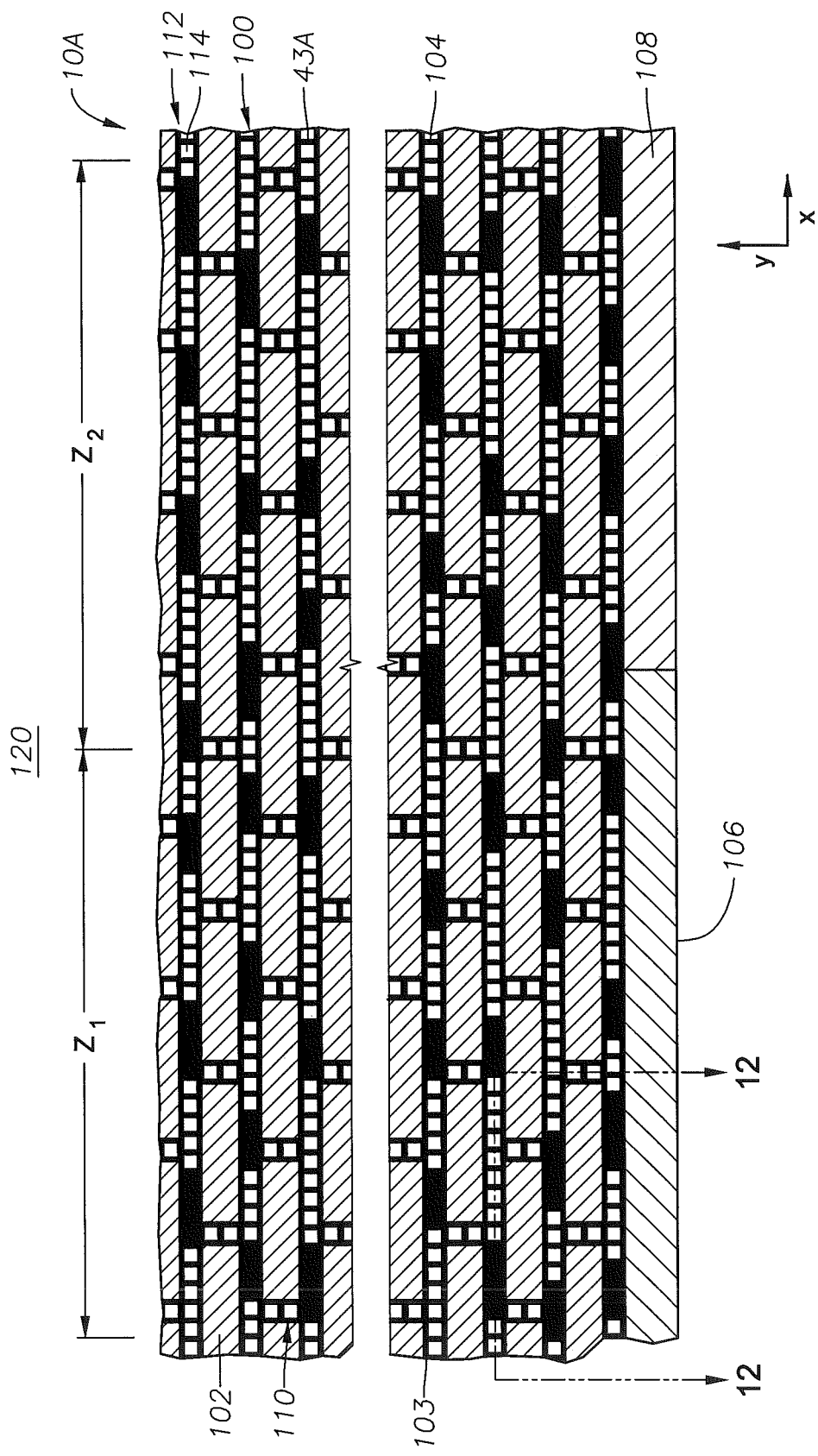
FIG. 11 is a side sectional view of an alternate embodiment of an environmental protective coating adhered to a surface.

Shown in a side sectional view in FIG. 11 is an alternate example of an EPC 10A, and which is shown having example shells 43A, some of which are arranged in parallel and adjacent one another to form arrays 100 between adjacent platelets 102. Mortar 103 is included with the shells 43A between the platelets 102; the shells 43A and mortar 103 form a generally compliant binder 104. EPC 10A is shown applied onto adjoining substrates 106, 108. Example substrates 106, 108 can be any surface having a protective coating, such as substrate 12 as discussed above. An X-Y coordinate frame having an X axis and Y axis is shown where the Y axis is shown in a generally vertical orientation and the X axis is shown in a generally horizontal orientation, however, other orientations are possible. As shown, spaces 110 are between adjacent platelets 102 and each have an elongate length that is generally aligned with the Y axis. Also shown are spaces 112 between adjacent platelets 102, and which each have an elongate length generally aligned with the X axis. The presence of the shells 43A in the mortar 103 forms voids 114 in the mortar 103. In an example, the mortar 103 is not porous and thus there is little to no communication between from one of the voids 114 to another void 114.

As described in more detail below, the binder 104 adheres adjacent platelets 102 to one another while allowing relative movement between the platelets 102, so that the EPC 10A can undergo strain without experiencing failure or delamination. As shown, the EPC 10A is applied on substrate 106, and extends past the edge of substrate 106 to a substrate 108, which is coplanar and adjacent to substrate 106. Thus if substrates 106, 108 have differing coefficients of thermal expansion, an increased amount of localized strain can occur in the EPC 10A in the area proximate where substrates 106, 108 abut one another with temperature changes. Moreover, examples exist wherein a coefficient of thermal expansion of the EPC 10A can be different from one or both substrates 106, 108; meaning strain likely will occur in the EPC 10A if its rate or amount of expansion or contraction differs with that of the substrates 106, 108. Further shown in FIG. 11 are zones $Z_1$, $Z_2$ that define a spatial area along the surface of the EPC 10A opposite where it is applied to substrates 106, 108. Examples exist wherein the respective temperatures or thermal transfer rates are different in the zones $Z_1$, $Z_2$ which can in turn create thermal expansion gradients within the EPC 10A. However, the compliant nature of the binder 104 for use in this improved EPC 10A allows localized density changes in the EPC 10A without spalling or delaminating the EPC 10A. The spacing and orientations of the voids 114 are engineered to create designated strain characteristics of the EPC 10A.

Figure 12:
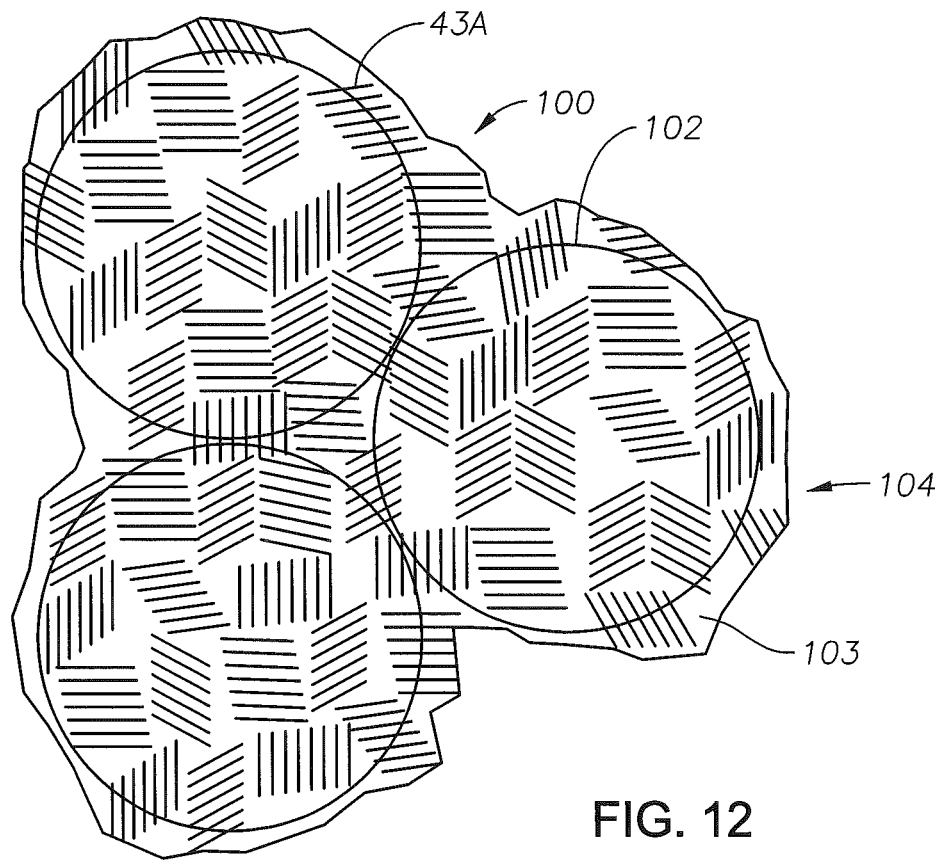
FIG. 12 is a plan sectional view of a portion of the environmental protective coating of FIG. 11.

FIG. 12, which is taken along lines 12-12 of FIG. 11, shows in a plan view an example of binder 104 disposed over a layer of platelets 102. In this example, the arrays 100 are illustrated as being made up of a number of elongate shells 43A that are arranged in rows within the mortar 103. While the shells 43A within the arrays 100 are generally parallel with one another, shells 43A in adjacent arrays 100 can be oriented in oblique arrangements. The random orientations of the arrays 100 yield an EPC 10A having substantially isotropic strain properties.

Figures 13A, 13B:
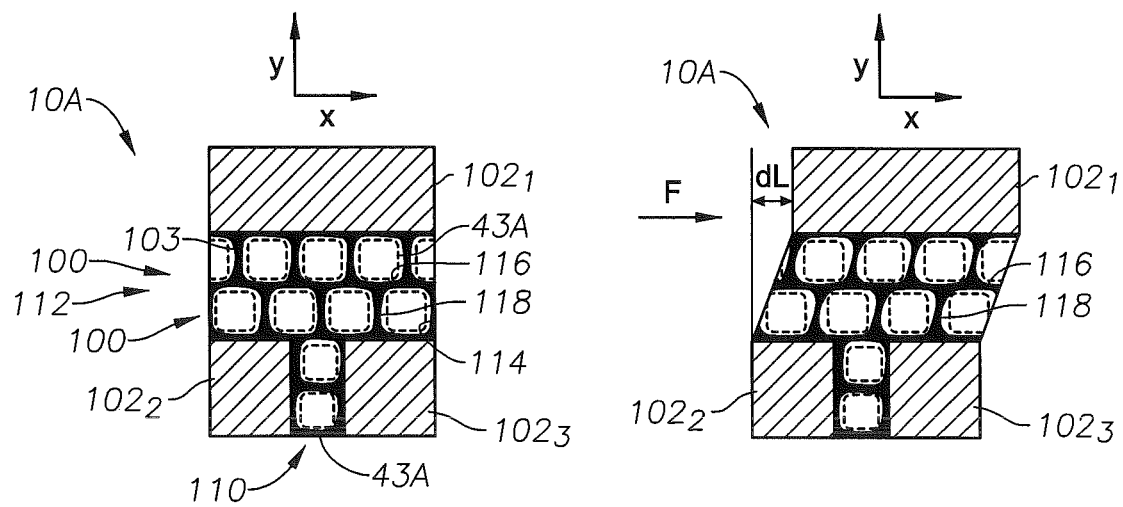
FIG. 13A is a side sectional view of a portion of the environmental protective coating of FIG. 11.
FIG. 13B is a side sectional view of the portion environmental protective coating of FIG. 13A undergoing a lateral strain.

Referring now to FIG. 13A, a portion of the EPC 10A of FIG. 11 is shown in detail in a side sectional view. The portion of the EPC 10A shown includes platelets $102_1$, $102_2$, and $102_3$, where platelet $102_1$ is axially spaced away from platelets $102_2$ and $102_3$ along the Y axis, and platelets $102_2$ and $102_3$ are spaced apart from one another along the X axis, but generally lie in the same plane that intersects the Y axis. A single row of shells 43A (and thus voids 114) are shown in the space 110 between platelets $102_2$ and $102_3$; multiple arrays 100 of shells 43A are shown stacked in the space 112 between platelets $102_1$ and $102_2/102_3$ that in turn form multiple rows of voids 114 between platelets $102_1$ and $102_2/102_3$. The strategic arrangement and configuration of the voids 114 in the mortar 103 fashions the mortar 103 so that the mortar 103 has a matrix like structure. In the illustrated example, the mortar 103 has elongated planar layers 116 extending generally parallel with the X axis, and elongate web members 118 that span between adjacent layers 116 and lie generally parallel with the Y axis. As such, the layers 116 and web members 118 run generally normal to one another so that the voids 114 have a substantially rectangular cross section.

In FIG. 13B, the portion of the EPC 10A of FIG. 13A is shown undergoing a deformation strain in response to force F being applied in a direction parallel with the X axis. Platelet $102_1$ is shown being displaced a distance dL by the force F and with respect to platelets $102_2$ and $102_3$. As indicated above, the force F can be the result of thermal gradients either in the EPC 10A or substrates 106, 108, or differences in coefficients of thermal expansion between the EPC 10A and substrates 106, 108. An advantage of the web members 118 being perpendicularly attached to the layers 116 is that a lower value of force F can produce strain in the EPC 10A, which in turn lessens shear forces on the bond between the EPC 10A and substrates 106, 108, thereby reducing the probability of delamination of the EPC 10A due to these forces.

In an embodiment, the advantageous micro-structure of the binder 104 is created by producing pre-existing conditions in the materials and processing sequence generating the microstructure as shown in FIG. 11. The particular materials and process conditions can change with the application environment. In an example application, the EPC 10A can operate in a temperature range of between 1650° C. to 2200° C., including oxidizing environments.

Example 1

In one non-limiting example, platelets are formed having a nominal 15-20 micron thickness, and with a greater than 10:1 diameter/thickness ratio. Mixed together are LLC CSO-390 hot melt carbosiloxane preceramic polymers (100 pph) (available from Extreme Environment Materials Solutions, 49 Geyser Road, Saratoga Springs, N.Y. 12866, 518.450.1055); acetone (150 pph); BF 17 0.5 micron SiC powder (100 pph) (available from HC Stark, http://www.hc-starck.com/en/home.html); and 43 nm ZrB2 powder (70 pph) (available from EPRUI Nanoparticles and Microspheres Co. Ltd., No. 188 Luhe Chemical Industry Zone, Nanjing, China, 86-21-60346644). This mixture is then put into a ball mill with 1.5 mm alumina media (400 pph) and milled for 12 hours at 50 rpm (or rpm sufficient for active tumbling). After ball milling, the mixture is drained through a filter, rinsed, and vacuum degassed with a solvent to produce a resin mixture. Release coating 700NC (available from Henkel FreKote) is applied to an etched stainless sheet mold 125 micron thick foil by 381 micron diameter blind holes etched 20 micron deep in hexagonal array (available from Tech Etch). The sheet mold is placed on a tooling plate covered with Teflon® film, and the edges are secured with tape. Holes in the sheet mold are filled with the resin mixture and then covered with 12.5 micron thick FEP Teflon® film (available from DuPont, http://www.americandurafilm.com/film-distribution/teflon-fep-film), a fine breather film is applied and degassed in a vacuum bag assembly. Further in this example, platelets are then thermoset in an autoclave under full vacuum, 90 psi pressure with 2.5° C./min ramp to 200° C., hold for 2 hrs. and cooled. Cure is completed and pyrolysis of platelets is done by heating at 10° C./min to 500° C. in an inert atmosphere; platelets are then removed from sheet mold. After pyrolysis is finished, ceramitization to SiC/particulate composite flake is completed by heating to 2000° C. in argon at 5° C./min; and then cooled.

Example 2

The following is a non-limiting example of forming a mold for the shells 43, 43A. A mold is used that is an elastic female replication of an etched Si master. A silicon master, available from SPTS Technologies Deep Reactive Ion Etching, 7377 William Ave, #800, Allentown, Pa. 18106, (610) 336 0314, is used for producing the 1.5 micron by 1.5 micron array of square ridges of the male tool at a spacing of 125 micron. The master is release coated with a dilute (1%) solution of detergent and dried at 85° C. overnight under >750 mmHg vacuum. The master is adhered to a larger tool plate, edge sealed with Viton® rubber and placed inside a vacuum chamber with a port to introduce a casting resin onto the mold while under full vacuum. The mold is produced using UV-PDMS KER-4690-AB silicone (available from Shin-Etsu, Asahi Seimei Otemachi Bldg., 6-1, Ohtemachi 2-chome, Chiyoda-ku, Tokyo 100-0004, Japan). Equal parts of A and B are mixed thoroughly at room temperature and degassed at full vacuum for 1 hr. after bubbling has ceased. The mixed silicone is applied under vacuum through the feed tube to the center of the master mold slowly allowing complete surface wetting. After the mold is covered and any residual bubbling has ceased, the vacuum is released. A pre-cured flat sheet of the UV-PDMS KER-4690-AB silicone applied from one edge of the filled mold, pushing out the air as it is rolled across the mold. The cured silicone sheet is covered with Teflon® release film, a UV-transparent caul plate and bagging film sealed to the tool. The bagged mold and resin is degassed for 1 hour before curing. The mold is exposed to UV light to initiate the reaction and cure the silicone, up to 60 minutes exposure. The cured mold is pulled from the master.

Example 3

The following is a non-limiting example of forming the shells 43, 43A where the silicone mold is cleaned, release coated with the Henkel FreKote 700 NC and adhered to an aluminum tool plate. An excess volume of SC-1008 phenolic resin (available from Hexion 180 East Broad Street Columbus, Ohio 43215) is poured onto the mold surface to fill the female trenches; manually distributing the resin with a squeegee or roller. Edge dams, made of SM 5153 sealant tape (available from ITWWIND Group, http://www.itw-wind.com) or silicone rubber, are applied to retain resin in the mold. The filled mold is covered with 12.5 micron thick Teflon® film (available from DuPont, DuPont High Performance Films, Route 23 South and DuPont Road, Circleville, Ohio 43113, (800) 967-5607) thin non-woven breather (AirTech N4 or equivalent) and nylon bagging film. Vacuum ports are installed in the bag, it is sealed with SM 5153. The phenolic resin is cured under full vacuum. The cure is accomplished in stages, 3° C./min to 75° C., hold one hour, 3° C./min to 115° C., hold 2 hours, 5° C./min to 180° C., hold 2 hours, cool at 5° C./min under pressure and vacuum. Segments of nominal 1.5 micron by 1.5 micron cured phenolic square elements for the binder are broken out by flexing the mold over a crowned roller to open up the mold trenches and initiate release of the square elements from the mold. The phenolic binder elements are placed in an inert atmosphere furnace and heated at 5° C./min to 800° C. to convert to carbon and produce sufficient strength for subsequent processing—which forms sized binder elements. The sized binder elements are smoothed by tumbling in a ball mill apparatus without media. A ratio of 100 pph sized binder elements to 250 pph acetone is turned for up to 24 hrs. to round off the edges of the binder elements, confirm with a scanning electron microscope. Rounding the edges of the binder elements forms the shells 43, 43A.

Example 4

The following is a non-limiting example of forming a binder having microstructure elements, and which includes filtering off solvent of Example 3 into container, rinsing with acetone (50 pph), where the acetone can be retained. The binder elements are dried at 120° C. in air for 30 minutes, then wetted with Henkel FreKote 700 NC, and dried again. These steps are repeated twice. The binder elements are cured at 180° C. in a vented container. The binder elements, retained solvent, and 50 pph (binder elements basis) of CSO-390 (available from Extreme Environment Materials Solutions, 49 Geyser Road, Saratoga Springs, N.Y. 12866, 518.450.1055) are combined in a ball mill and mixed for 30 minutes to thoroughly coat. The suspension is filtered to collect the coated binder elements, allowed to dry and cured to 200° C.: ramp at 3° C./min, hold for 2 hrs. Pyrolysis up to 800° C. can be used to adjust strength of the coating to improve subsequent processing. Short segments, L/D of 5 to 20, are formed for the final binder formulation. If the L/D is too great, i.e. exceeds 5 to 20, clumped binder elements can be pressed in a closed mold at up to 50,000 psi to break up clumps and reduce their length to the 5-20 L/D desired for processability of high loading in the binder formulation.

Example 5

The following provides a non-limiting example of forming an EPC coating by combining together the binder microstructure elements (100 pph) of Example 4, LLC CSO-111HT stabilized carbosiloxane preceramic polymers (250 pph) (available from Extreme Environment Materials Solutions, 49 Geyser Road, Saratoga Springs, N.Y. 12866, 518.450.1055); acetone (50 pph); SiC platelets (optional SiC material 40 nm powder) (50 pph); and 43 nm ZrB2 powder (25 pph), both the SiC and ZrB2 powder are available from EPRUI Nanoparticles and Microspheres Co. Ltd., No. 188 Luhe Chemical Industry Zone, Nanjing, China, 86-21-60346644. The combined components are then added to a high shear centrifugal mixer (available from THINKY USA, INC., 23151 Verdugo Drive, Suite 107, Laguna Hills, Calif. 92653, (949)768-9001). The combination is mixed for intervals of 120 seconds until smooth and evenly colored, cool between intervals if temperature exceeds 150° F. 500 pph of platelets (such as from Example 1 above) to the mixture and mixed in the centrifugal mixer for 120 second intervals until smooth and uniform.

Example 6

The following provides a non-limiting example of applying an EPC coating of Example 5 onto a substrate. The substrate is prepared by removing surface glazing of ceramic matrix composite by abrasion, dust is vacuumed away and solvent wipe with lint free cloth; dry. Abrasion should be sufficient to expose virgin substrate or matrix micro-cracking of ceramic matrix composites for mechanical interlocking of EPC coating. The EPC coating is brushed, squeegeed or rolled onto substrate. After uniformly applying to 75 to 125 micron thickness, shear the EPC coating with a brush or squeegee to orient platelets parallel to the substrate surface. Solvent is allowed to bloom and stiffen the EPC coating to maintain application uniformity. Up to three layers, 250 micron total, may be used to ensure sufficient coating thickness on all surface features. EPC coating viscosity may be adjusted by adding acetone or degassing in vacuum chamber to achieve consistent spreading and wetting of substrate. The coating is dried for one hour at room temperature and cured; heat at less than 5° C./min to 75° C.; hold 30 minutes; heat to 125° C.; hold for 30 minutes; heat at 5° C./min to 400° C.; hold for one hour. The substrate with applied EPC coating is placed in a furnace and pyrolyzed and ceramitized to the use temperature in argon atmosphere to ceramitize binder and generate free volume with crack/void microstructure enabling high strain binder response to resist spalling of EPC. Optionally, a heat lamp or torch can be used to heat the EPC layer for local areas. EPC coated substrate can be further exposed to high temperature oxygen containing atmosphere (greater than 1000° C.) to initiate oxidation of refractory species to oxide glasses to seal any EPC coating pinholes before use.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A coating for protecting a surface comprising:
   heat resistant platelets coupled to the surface and arranged in layers that are spaced apart from one another in a direction extending axially from the surface;
   spaces between adjacent platelets in the same layer, spaces between platelets in adjacent layers, and spaces between the platelets and the surface;
   a compliant binder in the spaces; and
   elongate voids having a generally rectangular cross section formed from shells and/or tubes in the binder that are strategically arranged to define axially spaced apart elongate layers of binder in the spaces, and that define elongate web members of binder that span between the spaced apart elongate layers of binder.

2. The coating of claim 1, wherein adjacent voids are generally parallel.

3. The coating of claim 1, wherein the tubes comprise a refractory or a ceramic.

4. The coating of claim 3, wherein the tubes further comprise a carbon tube.

5. The coating of claim 1, wherein some adjacent voids are parallel and define arrays, and wherein voids in some of the arrays are oblique to voids in other arrays so that the binder is anisotropic.

6. The coating of claim 1, wherein more than one layer of voids is disposed between axially spaced apart adjacent platelets.

7. The coating of claim 1, wherein the platelets comprise a refractory material.

8. The coating of claim 1, wherein the surface has portions with different coefficients of thermal expansion, and wherein the coating experiences a lateral strain from a lateral force that is exerted onto the binder when one of the portions expands a different amount than an adjacent portion.

9. The coating of claim 1, wherein elongate lengths of the web members extend in a direction generally perpendicular with the surface, and pivot to an orientation that is oblique with the surface when the coating undergoes a lateral strain.

10. The coating of claim 9, wherein the lateral strain is generated by a force that is applied laterally to the coating, and wherein the lateral strain absorbs a portion of the force and reduces a shear force in a bond between the surface and the coating that results from the force.

11. The coating of claim 10, wherein the force is generated by thermal expansion of the surface.

12. The coating of claim 9, wherein platelets in a one of the layers are displaced a first lateral distance when the coating undergoes the lateral strain, and wherein platelets in a layer adjacent the one of the layers are displaced a second lateral distance when the coating undergoes the lateral strain, and wherein the first and second lateral distances are different.

13. The coating of claim 1, wherein more than one row of voids are formed between adjacent platelets that are spaced axially apart.

* * * * *